US010685120B2

(12) United States Patent
Chen

(10) Patent No.: US 10,685,120 B2
(45) Date of Patent: Jun. 16, 2020

(54) DATA STORAGE DEVICE AND DATA STORAGE METHOD FOR CONFIRMING FIRMWARE DATA

(71) Applicant: Silicon Motion, Inc., Jhubei, Hsinchu County (TW)

(72) Inventor: Yu-Da Chen, Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 209 days.

(21) Appl. No.: 16/039,596

(22) Filed: Jul. 19, 2018

(65) Prior Publication Data

US 2019/0147165 A1 May 16, 2019

(30) Foreign Application Priority Data

Nov. 14, 2017 (TW) .............................. 106139309 A

(51) Int. Cl.
| | |
|---|---|
| *G06F 21/57* | (2013.01) |
| *H04L 9/06* | (2006.01) |
| *G06F 3/06* | (2006.01) |
| *H04L 9/32* | (2006.01) |
| *G06F 8/654* | (2018.01) |

(52) U.S. Cl.
CPC ............ *G06F 21/572* (2013.01); *G06F 3/064* (2013.01); *G06F 3/0607* (2013.01); *G06F 3/0622* (2013.01); *G06F 3/0679* (2013.01); *G06F 8/654* (2018.02); *H04L 9/0643* (2013.01); *H04L 9/3239* (2013.01); *H04L 2209/26* (2013.01)

(58) Field of Classification Search
CPC ...... G06F 21/572; G06F 8/654; G06F 3/0607; G06F 3/0622; G06F 3/0679; G06F 3/064; G06F 3/0629; G06F 3/0619; G06F 3/061; H04L 9/0643; H04L 9/3239; H04L 2209/26
See application file for complete search history.

(56) References Cited

U.S. PATENT DOCUMENTS

| | | |
|---|---|---|
| 2006/0095825 A1 | 5/2006 | Pan |
| 2007/0055969 A1 | 3/2007 | Yang |
| 2007/0174849 A1 | 7/2007 | Cheung et al. |
| 2008/0109798 A1 | 5/2008 | Gavens et al. |
| 2012/0023309 A1 | 1/2012 | Abraham et al. |
| 2013/0188429 A1 | 7/2013 | Huang |

(Continued)

FOREIGN PATENT DOCUMENTS

| | | |
|---|---|---|
| TW | 200604934 A | 2/2006 |
| TW | 200713037 A | 4/2007 |

*Primary Examiner* — Nelson S. Giddins
(74) *Attorney, Agent, or Firm* — McClure, Qualey & Rodack, LLP

(57) ABSTRACT

A data storage device utilized for confirming firmware data includes a flash memory and a controller. The controller is coupled to the flash memory to receive first firmware data and first sorting hash data related to the first firmware data, and it divides a first hash data generated from the first firmware data into a plurality of data groups, and re-assembles the data groups according to a mapping and sorting algorithm to generate second sorting hash data. The controller includes an efuse region for writing the mapping and sorting algorithm. When the controller determines that the second sorting hash data is identical to the first sorting hash data, the first firmware data is allowed to update the controller.

18 Claims, 14 Drawing Sheets

(56) References Cited

U.S. PATENT DOCUMENTS

2014/0136856 A1* 5/2014 Flynn .................... G06F 9/4406
                                                        713/193
2017/0373839 A1* 12/2017 Suresh .................. H04L 9/0618
2018/0019876 A1* 1/2018 Moss ....................... G06F 21/64

* cited by examiner

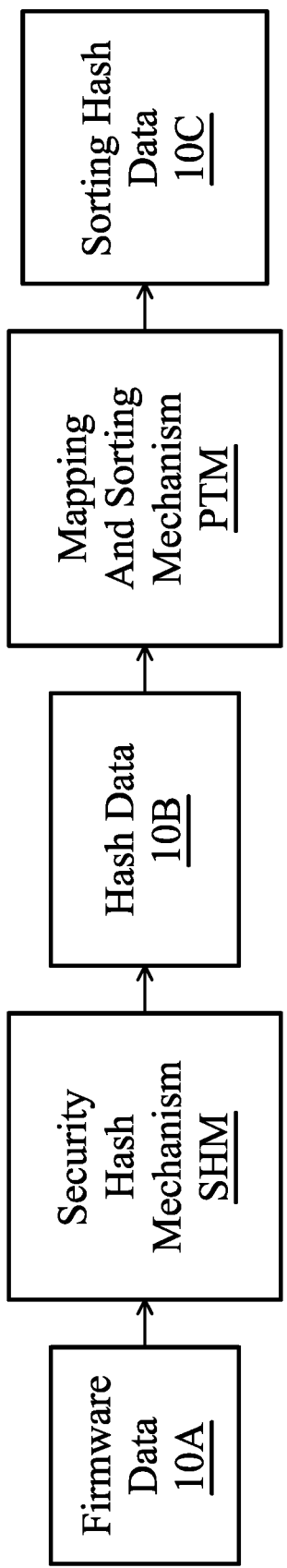
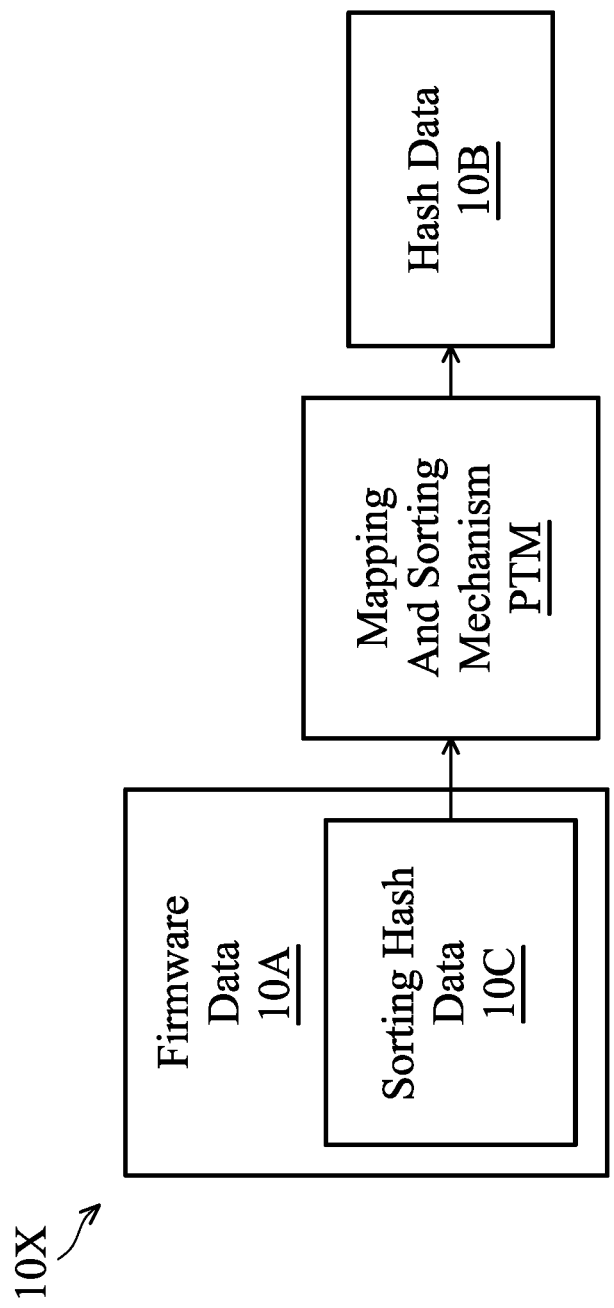
FIG. 2A
FIG. 2B

| | | | | | | | | 40C |
|---|---|---|---|---|---|---|---|---|
| A | Y | B | CC | C | J | S | EE | |
| L | R | K | Z | DD | O | B | F | |
| A | X | D | T | E | AA | F | V | |
| M | I | D | N | G | E | C | G | |
| W | Q | FF | H | BB | P | U | H | |

| | | | | | | | | 40B |
|---|---|---|---|---|---|---|---|---|
| A | B | C | D | E | F | G | H | |
| I | J | K | L | M | N | O | P | |
| Q | R | S | T | U | V | W | X | |
| Y | Z | AA | BB | CC | DD | EE | FF | |

| | | | | | | | | 40C-1 |
|---|---|---|---|---|---|---|---|---|
| A+A | B+Y | C+B | D+CC | E+C | F+J | G+S | H+EE | |
| I+L | J+R | K+K | L+Z | M+DD | N+O | O+B | P+F | |
| Q+A | R+X | S+D | T+T | U+E | V+AA | W+F | X+V | |
| Y+M | Z+I | AA+D | BB+N | CC+G | DD+E | EE+C | FF+G | |
| W | Q | FF | H | BB | P | U | H | |

| A | B | C | D | E | F | G | H |
|---|---|---|---|---|---|---|---|
| I | J | K | L | M | N | O | P |
| Q | R | S | T | U | V | W | X |
| Y | Z | AA | BB | CC | DD | EE | FF |
| GG | JJ | II | JJ | KK | LL | MM | NN |

40C

| A | Y | B | CC | C | J | S | EE |
|---|---|---|---|---|---|---|---|
| L | R | K | Z | DD | O | B | F |
| A | X | D | T | E | AA | F | V |
| M | I | D | N | G | E | C | G |
| W | Q | FF | H | BB | P | U | H |

OPM-1

| 1 | 2 | 1 | 1 | 2 | 2 | 1 | 2 |
|---|---|---|---|---|---|---|---|
| 1 | 1 | 1 | 1 | 2 | 2 | 1 | 1 |
| 1 | 2 | 1 | 2 | 1 | 1 | 2 | 2 |
| 1 | 1 | 2 | 2 | 1 | 2 | 1 | 1 |
| 0 | 0 | 0 | 0 | 3 | 3 | 4 | 4 |

40C-3

| A+A | B-Y | C+B | D+CC | E-C | F-J | G+S | H-EE |
|---|---|---|---|---|---|---|---|
| I+L | J+R | K+K | L-Z | M-DD | N-O | O+B | P+F |
| Q+A | R-X | S+D | T-T | U+E | V+AA | W-F | X-V |
| Y+M | Z+I | AA-D | BB-N | CC+G | DD-E | EE+C | FF+G |
| W | Q | FF | H | BB*KK | P*LL | U/MM | H/NN |

FIG. 4D

DATA STORAGE DEVICE AND DATA STORAGE METHOD FOR CONFIRMING FIRMWARE DATA

CROSS REFERENCE TO RELATED APPLICATIONS

This Application claims priority of Taiwan Patent Application No. 106139309 filed on Nov. 14, 2017, the entirety of which is incorporated by reference herein.

BACKGROUND OF THE INVENTION

Field of the Invention

The disclosure generally relates to a data storage device and a data storage method, and more particularly, to a data storage device and a data storage method for certifying firmware data.

Description of the Related Art

Flash memory is a common type of non-volatile data storage device which electrically performs erasing and programming. NAND flash is often utilized in memory cards, USB flash devices, SSDs, eMMCs, UFSs, and so on.

Generally, the performance and reliability of a data storage device can be improved by updating the firmware. Updating the firmware can confirm that the data storage device is in the latest state and compatibility is guaranteed. However, when the data storage device updates with erroneous or illegal firmware, the data storage device might not be able to perform normal operations such as reading and writing. The data storage device may even be damaged. Therefore, a data storage device and a data storage method for efficiently and conveniently certifying the firmware data are needed to confirm the legality and accuracy of the firmware data which is going to be used in an update.

BRIEF SUMMARY OF THE INVENTION

In order to solve the aforementioned problem, the invention proposes a data storage device and a data storage method for certifying the firmware data efficiently and conveniently, in order to confirm that the updated firmware data is accurate.

Specifically, the present invention provides a security hash algorithm (SHA) and a mapping and sorting algorithm to inspect whether or not the firmware data that is going to be installed is legal and accurate. At first, the SHA executes encryption and compression for the firmware data to generate the hash data. Afterwards, the hash data is re-assembled by the mapping and sorting algorithm and stored at the specific position of the data storage device. The above mapping and sorting algorithm is set up by the manufacturer of the data storage device. The mapping and sorting algorithm is not the one-to-one mapping to increase the mapping complexity. Whether or not the firmware data to be installed is identical to the legal and accurate firmware data certificated by the manufacturer of the data storage device can be determined by comparing the firmware data to be installed and its related hash data to the sorting hash data. Whether or not the firmware data to be installed is accurate and legal can be determined by the data storage device and the data storage method of the present invention to prevent the data storage device from being damaged deliberately.

In one aspect of the invention, a data storage device utilized for confirming firmware data includes a flash memory and a controller. The controller is coupled to the flash memory to receive at least one first sorting hash data which is related to first firmware data and divide the first hash data into a plurality of data groups. The controller reassembles the data groups based on a mapping and sorting algorithm to generate second sorting hash data. Each of the data groups of the first hash data is not one-to-one mapping to the second sorting hash data. The controller further includes an efuse region which is utilized for writing the mapping and sorting algorithm. When the controller determines that the second sorting hash data is identical to the first sorting hash data, the first firmware data is allowed to update the controller.

In another aspect of the invention, a data storage device utilized for confirming firmware data includes a flash memory and a controller. The controller is coupled to the flash memory to receive at least one first hash data related to first firmware data, and it divides the first hash data into a plurality of data groups. The controller sorts the data groups based on a predetermined sorting algorithm to generate first sorting hash data. The first hash data is generated by compressing the first firmware data based on a secure hash algorithm (SHA). The controller further comprises an efuse region for storing the predetermined sorting algorithm and the first sorting hash data.

In another aspect of the invention, a data storage method for certifying firmware data, applied to a data storage device which comprises a flash memory and a controller, is provided. The data storage method includes: receiving at least one first sorting hash data which is related to first firmware data; dividing the first hash data into a plurality of data groups; reassembling the data groups based on a mapping and sorting algorithm to generate second sorting hash data, writing the mapping and sorting algorithm; and when the controller determines that the second sorting hash data is identical to the first sorting hash data, allowing the first firmware data to update the controller. Each of the data groups of the first hash data is not one-to-one mapping to the second sorting hash data.

Other aspects and features of the present invention will become apparent to those with ordinary skill in the art upon review of the following descriptions of specific embodiments of the data storage device and the data storage method.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2A is schematic illustrating a data storage method for certifying firmware data according to an embodiment of the invention;

FIG. 2B is schematic illustrating another data storage method for certifying firmware data according to an embodiment of the invention;

FIG. 4B is a schematic illustrating the hash data and the sorting hash data according to an embodiment of the invention;

FIG. 4D is a schematic illustrating the computing algorithm, the hash data and the sorting hash data according to another embodiment of the invention;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
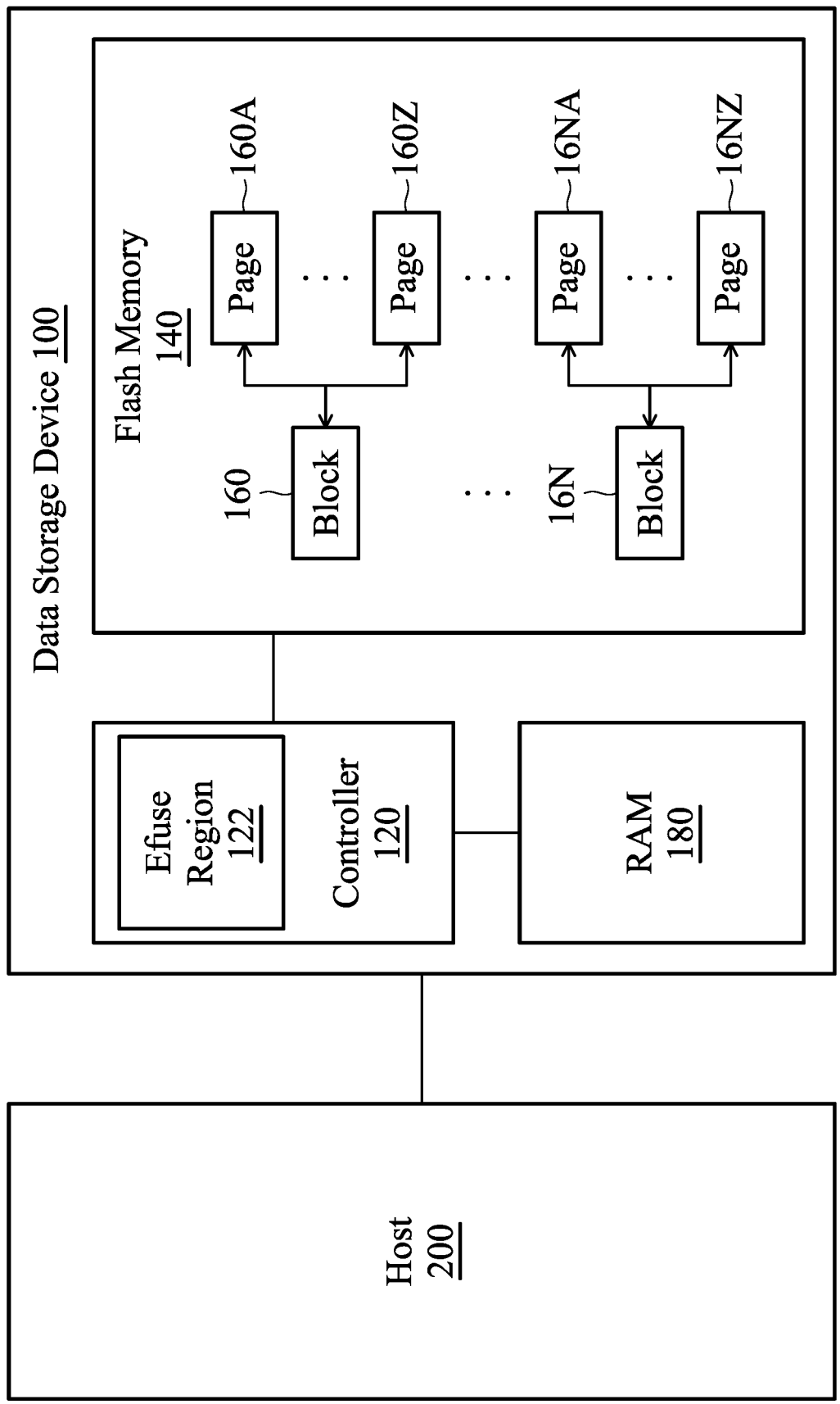
FIG. 1 is a schematic illustrating the data storage device and the host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic illustrating the data storage device 100 and the host 200 according to an embodiment of the invention. In one embodiment, the data storage device 100 includes a controller 120, a non-volatile memory and a random access memory (RAM) 180. The controller 120 includes an electrical fuse (efuse) region 122. The data storage device 100 is coupled to the host for transmitting data and commands, or receiving data and commands. The non-volatile memory could be NAND flash, magneto-resistive RAM, ferroelectric RAM, resistive RAM (RRAM), spin transfer torque RAM (STT-RAM), and so on, in order to store data for a long time. The flash memory 140 will be taken as an example for illustration in the following description, but is not limited. The data storage device 100 complies with the eMMC standard, the UFS standard, the SATA standard or NVMe standard. The host 200 could be various kinds of electronic device such as a cell phone, a tablet computer, a laptop computer, a navigator, or a car system.

As shown in FIG. 1, the controller 120 is coupled to the flash memory 140 and the RAM 180. The RAM 180 is utilized to temporarily store and cache the data which is needed by the controller 120, or temporarily store the data which will be written to the flash memory 140 by the host 200 in order to facilitate timely access to the data storage device 100. The controller 120 performs a read operation on the flash memory 140 by controlling the flash memory 140 in units of clusters. In addition, the controller 120 is coupled to the flash memory 140 to transmit data and instructions or to receive data and instructions mutually.

The efuse region 122 is mainly utilized to store important data which is related to the security and access of the data storage device 100, such as a second key for decoding the first key. Under normal operations, only the controller 120 can read the data stored in the efuse region 122. In the debug mode, the efuse region 122 will be closed or shielded to avoid reading. It should be noted that the firmware data is one-time written to the efuse region 122.

The flash memory 140 includes a plurality of blocks 160A~160N, and N is a positive integer. For example, N is 2048. Specifically, each of the blocks 160A~160N further includes a plurality of physical pages 160A~16NZ. The A and Z are positive integers. For example, A is 0 and Z is 256. The block 160 includes physical pages 160A~160Z, and the block 16N includes physical pages 16NA~16NZ. When the controller 120 performs a write operation or a programming operation on the flash memory 140, it controls the flash memory 140 to perform the write or programming operation in units of physical pages.

Regarding the flash memory 140, each of the physical pages 160A~16NZ has a different physical address. In other words, each of the physical pages 160A~16NZ has a physical address, and each physical address of the physical pages 160A~16NZ is different. When a write operation is executed by the data storage device 100, the controller 120 determines the physical address of the flash memory 140 for writing or storing data. In addition, the physical addresses are mapped to a plurality of respective logical addresses by the controller 120. In addition, the controller 120 records the mapping relationship between the logical addresses and the physical addresses, and the above record is stored in a mapping table H2F. Therefore, for the host 200, the host 200 reads or writes data which is stored in a logical address by the data storage device 100 through the logical address.

FIG. 2A is schematic illustrating a data storage method for certifying firmware data according to an embodiment of the invention. The firmware data 10A is generated by a compiler. Afterwards, as shown in FIG. 2A, a hash data 10B is generated from the firmware data 10A using a secure hash algorithm (SHA) 300. For example, the hash data 10B with a length of 256 bits is generated from the firmware data 10A in the operation of SHA-256. It should be noted that the above SHA is for illustration, not for limiting the present invention.

In one embodiment, the controller 120 receives the firmware data 10A, and executes the SHA 300 for the firmware data 10A to generate and receive the hash data 10B. In another embodiment, other devices (such as the host 200) execute the SHA 300 for the firmware data 10A to generate the hash data 10B, and the controller 120 receives the hash data 10B.

In one embodiment, the controller 120 divides the hash data 10B into a plurality of data groups, and performs sorting for the above data groups with a mapping and sorting algorithm PTM to generate the sorting hash data 10C. The above mapping and sorting algorithm PTM is stored in the efuse region 122 of the controller 120. For example, the size of the hash data 10B is 8 bytes, and its content is illustrated as below:

TABLE I

| Value | 0x47 | 0x54 | 0x00 | 0x28 | 0x01 | 0x47 | 0x38 | 0x36 |
|---|---|---|---|---|---|---|---|---|
| Byte | H | G | F | E | D | C | B | A |

Table I illustrates the data of each byte of the hash data 10B. In one embodiment, the controller 120 divides the above data of 8 bytes into groups and generates multiple data groups. For example, the size of each data group is 1 byte. In other words, each 1-byte data is regarded as a data group. In another embodiment, the size of each data group is 2 bytes, which means that two 1-byte data are regarded as a data group. For example, in the Table I, 0x54 and 0x47 are a data group, and 0x28 and 0X00 is another data group. It should be noted that the data size of the data group is for illustration, not for limiting the present invention. Persons skilled in the art could arrange other data size for the data group without extend beyond the scope of the present invention.

In the embodiment, the data size of the hash data 10B is 8 bytes. In another embodiment, the data size of the hash data 10B is 32 bytes. When a more complicated secure hash algorithm SHM and a mapping and sorting algorithm PTM, or other algorithms (such as the predetermined division algorithm or the predetermined re-compression algorithm) are utilized, the efuse region 122 will need bigger storage to store the above algorithms. The above predetermined division algorithm and the predetermined re-compression algorithm will be described in detail in FIG. 3 and FIG. 4, respectively.

In the embodiment, each 1-byte data becomes a data group. In other words, 0X54 of Table I is a data group, and 0x28 is another data group. Afterwards, the hash data 10B is sorted by the mapping and sorting algorithm PTM in units of data groups to generate the sorting hash data 10C. It should be noted that the predetermined sorting algorithm 300 is stored in the efuse region 122 is a manner of table. For example, the predetermined sorting algorithm 300 is illustrated in Table II:

TABLE II

| A | B | G | F | B | D | E | C |
|---|---|---|---|---|---|---|---|

The address of content of the hash data 10B is changed by the mapping and sorting algorithm PTM. Specifically, 0x54 is changed from the position of Byte G to the position of Byte F, 0x28 is changed from the position of Byte E to the position of Byte B, and 0x07 is changed from the position of Byte C to the position of Byte A. It should be noted that the data at the position of Byte B is replicated, and the data at the position of Byte H is ignored. Therefore, the table II illustrates two data of the position of Byte B, and does not illustrate any data of the position of Byte H. In other words, the mapping and sorting algorithm PTM of the present invention is not the one-to-one mapping. Therefore, the complexity of mapping and sorting has been increased accordingly to improve the security of the data storage device 100.

Specifically, double protection algorithms are provided by the data storage method of the present invention which includes the SHA 300 and the mapping and sorting algorithm PTM. The hash data 10B (as shown in Table I) generated by the SHA 300 is re-arranged and re-sorted by the mapping and sorting algorithm PTM to become the sorting hash data 10C (as shown in Table II). When someone wants to update illegal firmware data to the data storage device 100, the hash data which is generated from the illegal firmware data by other security hash algorithms will be different from the sorting hash data 10C. Therefore, the controller 120 could determine that the above hash data is illegal, and refuses to install or update the illegal firmware data for the data storage device 100.

FIG. 2B is schematic illustrating another data storage method for certifying firmware data according to an embodiment of the invention. In the embodiment, the sorting hash data 10C and the firmware data 10A constitute the firmware package 10X. Afterwards, the mapping and sorting algorithm PTM executes a reverse sorting for the sorting hash data 10C to generate the hash data 10B.

In one embodiment, the generation method or the storage location of the hash data 10B is set up by the manufacturer of the data storage device 100. Since other people are not aware of the generation method or the storage location of the hash data 10B, the controller 120 can inspect whether or not another firmware data is legal and accurate. Therefore, the data storage method of the present invention can avoid updating or installing illegal firmware data to protect the data storage device 100 from deliberate damage.

In one embodiment, the mapping and sorting algorithm PTM is set up by the manufacturer of the data storage device 100. For example, some people know the SHA 300 by illegal ways and know the storage location of the hash data 10B, combines another firmware data and the hash data 10B to form a firmware package, and intends to update the illegal firmware data to the data storage device 100. Because the person does not know the mapping and sorting algorithm PTM, the data included by the firmware package is the hash data 10B, not the sorting hash data 10C generated by the mapping and sorting algorithm PTM. Therefore, the controller 120 can distinguish the difference between the sorting hash data 10C and the hash data 10B, and further determine that the above firmware data is illegal. Afterwards, the controller 120 rejects installing or updating the illegal firmware data to the data storage device 100 to protect the data storage device 100 from deliberate damage.

Figure 2C:
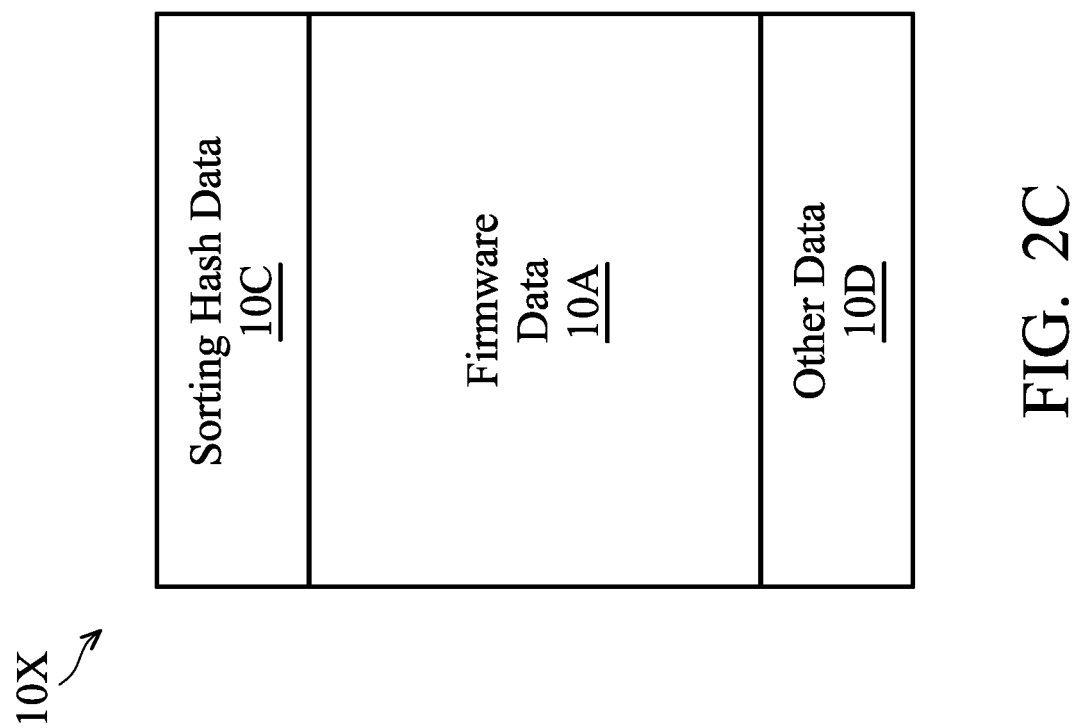
FIG. 2C is a schematic illustrating the firmware data according to an embodiment of the invention.

FIG. 2C is a schematic illustrating the firmware data according to an embodiment of the invention. As shown in FIG. 2C, in one embodiment, the sorting hash data 10C is stored above the firmware data 10A. In addition, other data 10D related to the firmware is stored below the firmware data 10A. In other words, the firmware package 10X includes the firmware data 10A, the sorting hash data 10C and other data 10D. For example, other data 10D includes the firmware edition, the edition of the SHA 300, and other security information which is stored by the customer. In other embodiments, the sorting hash data 10C could be stored below the firmware data 10A.

In one embodiment, when the data storage device 100 receives the firmware package 10X, the controller 120 executes the SHA 300 of the firmware data 10A of the firmware package 10X to obtain the hash data 20B, and it executes the mapping and sorting algorithm PTM to obtain the sorting hash data 20C. In one embodiment, the controller 120 compares the sorting hash data 20C and the sorting hash data 10C stored by the firmware package 10X. When they are identical, it means that the firmware data 10A is legal and accurate. When they are not identical, it means that the firmware data 10A is illegal.

In another embodiment, when the storage device 100 receives the firmware package 10X, the controller 120 executes the SHA 300 for the firmware data 10A of the firmware package 10X to obtain the hash data 20B. Afterwards, the controller 120 executes the reverse mapping and sorting algorithm PTM for the sorting hash data 10C of the firmware package 10X to obtain the hash data 10B. Afterwards, the controller mapping and sorting algorithm PTM compares the hash data 20B and the firmware data 10B of the firmware package 10X. When they are identical, it means that the firmware data 10A is legal and accurate. When they are not identical, it means that the firmware data 10A is illegal.

In another embodiment, an encryption algorithm (such as the Advanced Encryption Standard, AES) or RSA encryption algorithm could be utilized for the firmware data 10A to generate an encryption data 10B.

Figure 3:
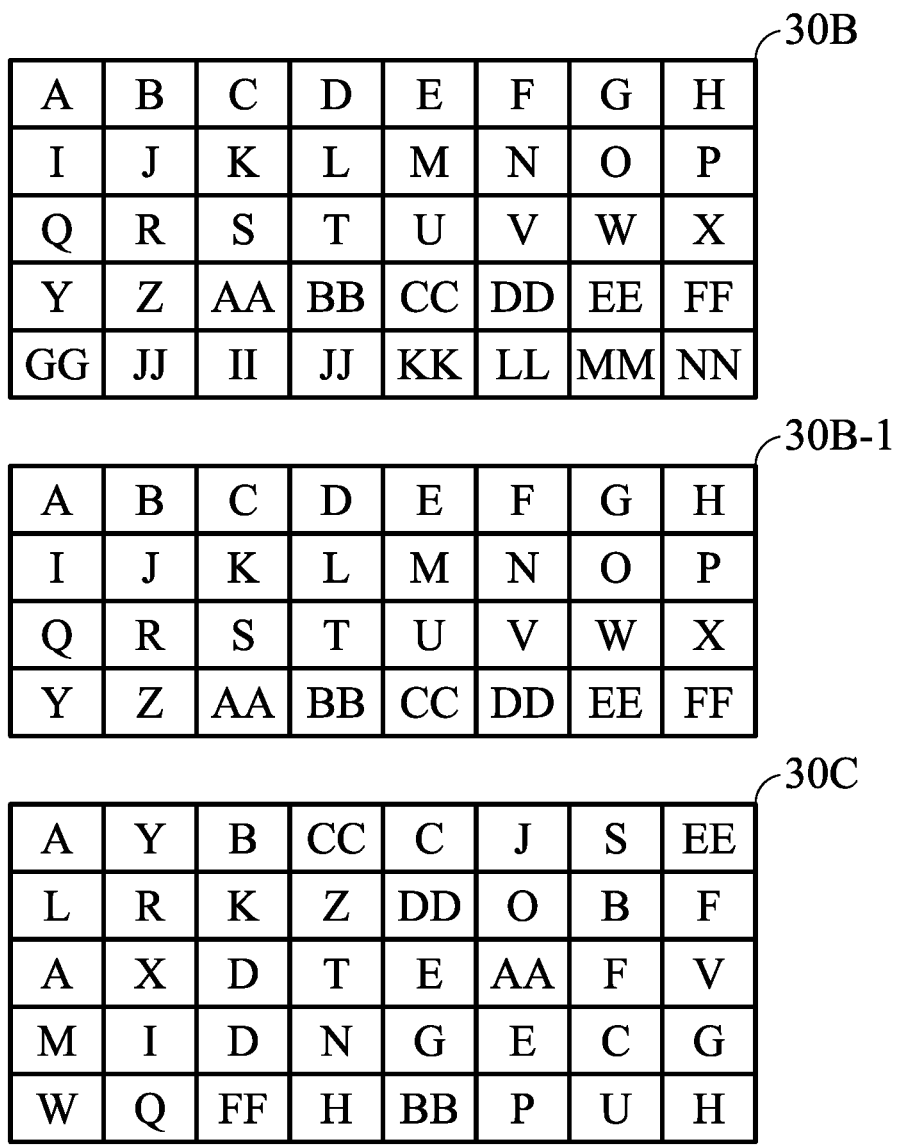
FIG. 3 is a schematic illustrating the hash data and the sorting hash data according to an embodiment of the invention.

FIG. 3 is a schematic illustrating the hash data and the sorting hash data according to an embodiment of the invention. In order to simplify and reduce the storage space, the firmware data and the hash data and the sorting hash data of the present invention are illustrated by tables. In one embodiment, the hash data 30B is generated by performing the security hash algorithm SHM on the firmware data. As shown in FIG. 3, the position sequence from Byte A to Byte NN of each byte is displayed by tables for the hash data 30B.

Afterwards, a portion of the hash data 30B is extracted by the controller 120 to form the hash data 30B-1. The mapping and sorting algorithm PTM is executed for the hash data 30B-1 by the controller 120 to obtain the sorting hash data 30C. It should be noted the data stored by each byte of the hash data 30B-1 does not map to the data stored by each byte of the sorting hash data 30C. For example, the sorting hash data 30C has two data of Byte A, but only has one data of Byte AA. In other words, a portion of the hash data 30B-1 is replicated. Furthermore, regarding the hash data 30B, the data from Byte GG to Byte NN is ignored and does not appear at the sorting hash data 30C.

Accordingly, the data storage method of the present invention not only re-sorts the hash data 30B but also re-assembles the data by replicating or ignoring to generate the sorting hash data 30C which is more chaotic and complicated and prevent the data from being cracked easily.

Figure 4A:
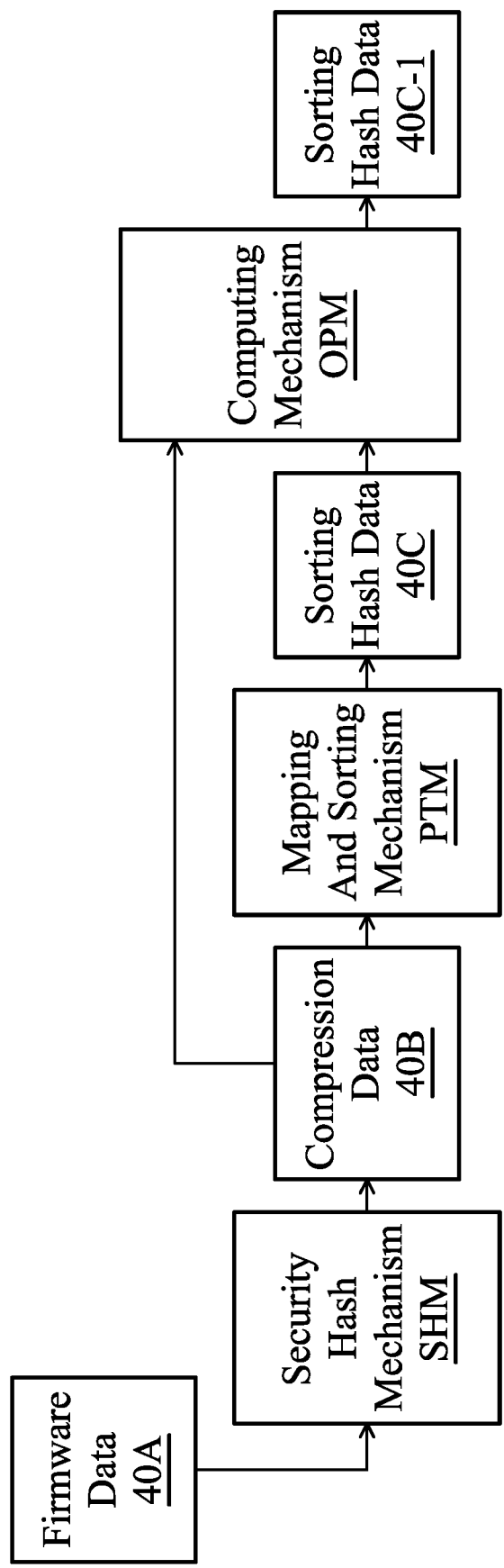
FIG. 4A is schematic illustrating a data storage method for certifying firmware data according to an embodiment of the invention.

FIG. 4A is schematic illustrating a data storage method for certifying firmware data according to an embodiment of the invention. Compared to the data storage method for certifying firmware data of FIG. 3, the embodiment of FIG. 4A further provides the computing algorithm OPM to perform various computations for the hash data, the firmware data and the sorting hash data. Specifically, the computing algorithm OPM includes the adding operation, the subtracting operation, the multiplication operation, the division operation, and no operation. By utilizing the computing algorithm OPM, the sorting hash data can be generated by a more complicated procedure to improve the security for updating the firmware.

In the embodiment of FIG. 4A, the security hash algorithm SHM is performed on the firmware data 40A to generate the hash data 40B, and the mapping and sorting algorithm PTM is performed on the hash data 40B to generate the sorting hash data 40C. Afterwards, the controller 120 performs computing for the hash data 40B and the sorting hash data 40C to generate another sorting hash data 40C-1. The sorting hash data 40C-1 is more complicated than the sorting hash data 40C because of the computing algorithm OPM to increase the difficulty of cracking the firmware data 40A. Various embodiments of the computing algorithm OPM will be illustrated in detail as below.

FIG. 4B is a schematic illustrating the hash data and the sorting hash data according to an embodiment of the invention. The sorting hash data 40C-1 is generated by adding the sorting hash data 40C and the hash data 40B. The adding operation is performed by adding data of each byte of the table with the data of each corresponding byte of another table. For example, regarding the data of first row and first column, the controller 120 adds the data of Byte A of the sorting hash data 40C and the data of Byte A of the hash data 40B to obtain the data of Byte A and Byte A of the sorting hash data 40C-1. Regarding the data of first row and second column, the controller 120 adds the data of Byte Y of the sorting hash data 40C and the data of Byte B of the hash data 40B to obtain the data of Byte Y and Byte B of the sorting hash data 40C-1.

It should be noted that because the hash data 40B has fewer columns than the sorting hash data 40C, the adding operation will not be performed on the data of Byte W to Byte H of the last column of the sorting hash data 40C. Because the hash data 40B and the sorting hash data 40C is not one-to-one mapping, their data size could be different. In another embodiment, the hash data 40B is extracted from a portion of another hash data, and its data size is smaller than the data size of the sorting hash data 40C.

Figure 4C:
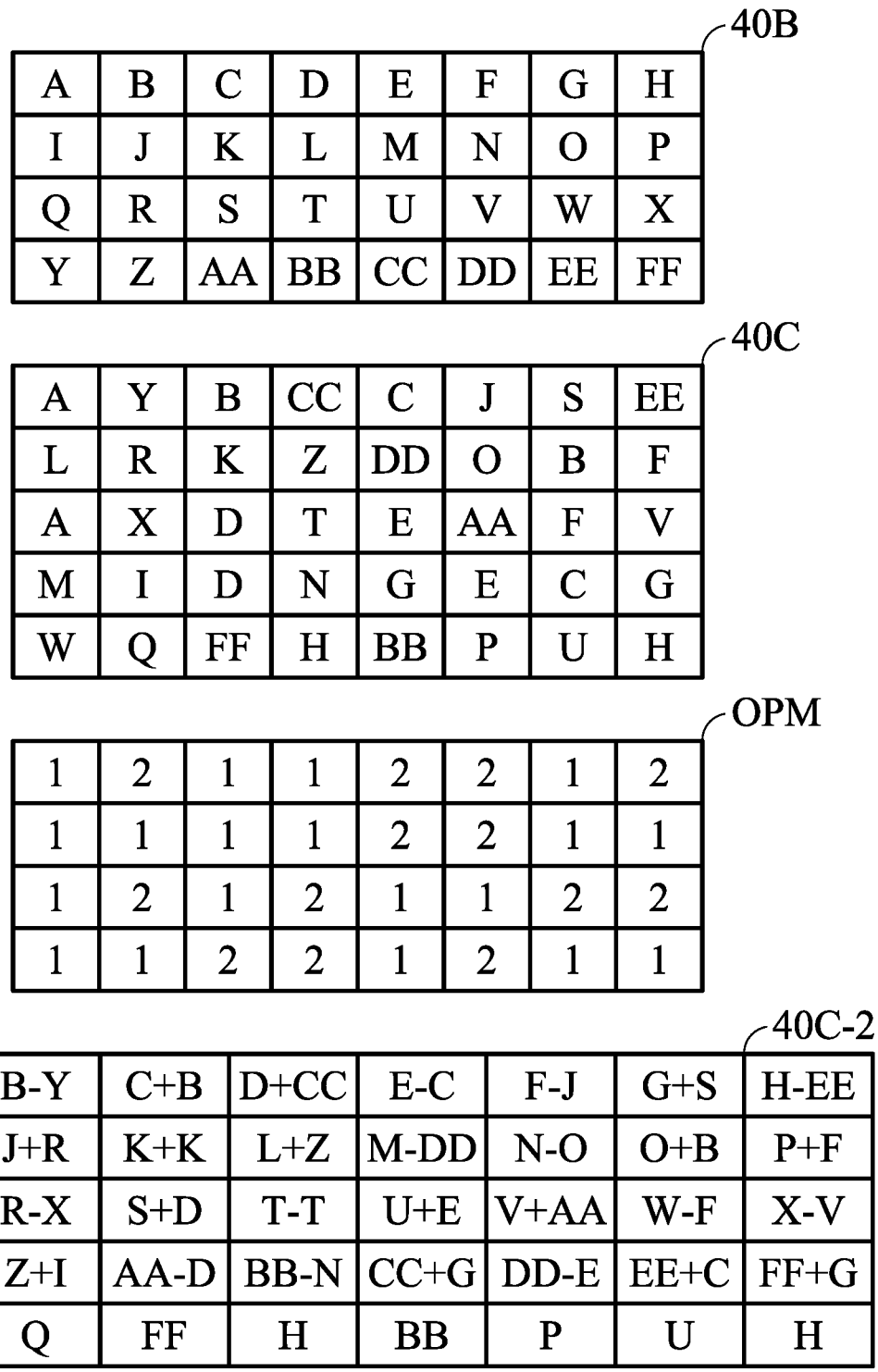
FIG. 4C is a schematic illustrating the computing algorithm, the hash data and the sorting hash data according to an embodiment of the invention.

FIG. 4C is a schematic illustrating the computing algorithm, the hash data and the sorting hash data according to an embodiment of the invention. The controller 120 performs computing on the hash data 40B and the sorting hash data 40C based on the computing algorithm OPM to generate the sorting hash data 40C-2. The above computing algorithm performs computation on the data of each byte of the table and the data of corresponding byte of another table. In one embodiment, several different values are utilized by the computing algorithm OPM to represent the computing type of execution. Specifically, on the table of the computing algorithm OPM, the value 1 indicates the adding operation, value 2 indicates the subtracting operation, value 3 indicates the multiplication operation, value 4 indicates the division operation, and value 0 indicates no operation.

For example, regarding the data of first row and first column, the controller 120 adds the data of Byte A of the sorting hash data 40C and the data of Byte A of the hash data 40B to obtain the data of Byte A plus Byte A of the sorting hash data 40C-2. Regarding the data of first row and second column, the controller 120 adds the data of Byte Y of the sorting hash data 40C and the data of Byte B of the hash data 40B to obtain the data of Byte B subtracting Byte Y of the sorting hash data 40C-1.

FIG. 4D is a schematic illustrating the computing algorithm, the hash data and the sorting hash data according to another embodiment of the invention. The controller 120 performs computing on the hash data 40B and the sorting hash data 40C based on the computing algorithm OPM to generate the sorting hash data 40C-2. It should be noted that in the embodiment of FIG. 4D, the data size of the hash data 40B and the sorting hash data 40C is the same. In other words, the amount of bytes included by the hash data 40B and the sorting hash data 40C is the same.

For example, regarding the data of the fifth row and first column, the controller 120 does not perform any operation for the data of Byte W of the sorting hash data 40C to obtain the data of Byte W of the sorting hash data 40C-3. Regarding the data of fifth row and fifth column, the controller 120 performs multiplication operation for the data of Byte KK of the hash data 40B and the data of Byte BB of the sorting hash data 40C to obtain the data of Byte KK multiplying Byte BB of the sorting hash data 40C-3. Regarding the data of fifth row and seventh column, the controller 120 performs division operation for the data of Byte NN of the hash data 40B and the data of Byte H of the sorting hash data 40C to obtain the data of Byte NN dividing Byte H of the sorting hash data 40C-3.

Figure 5:
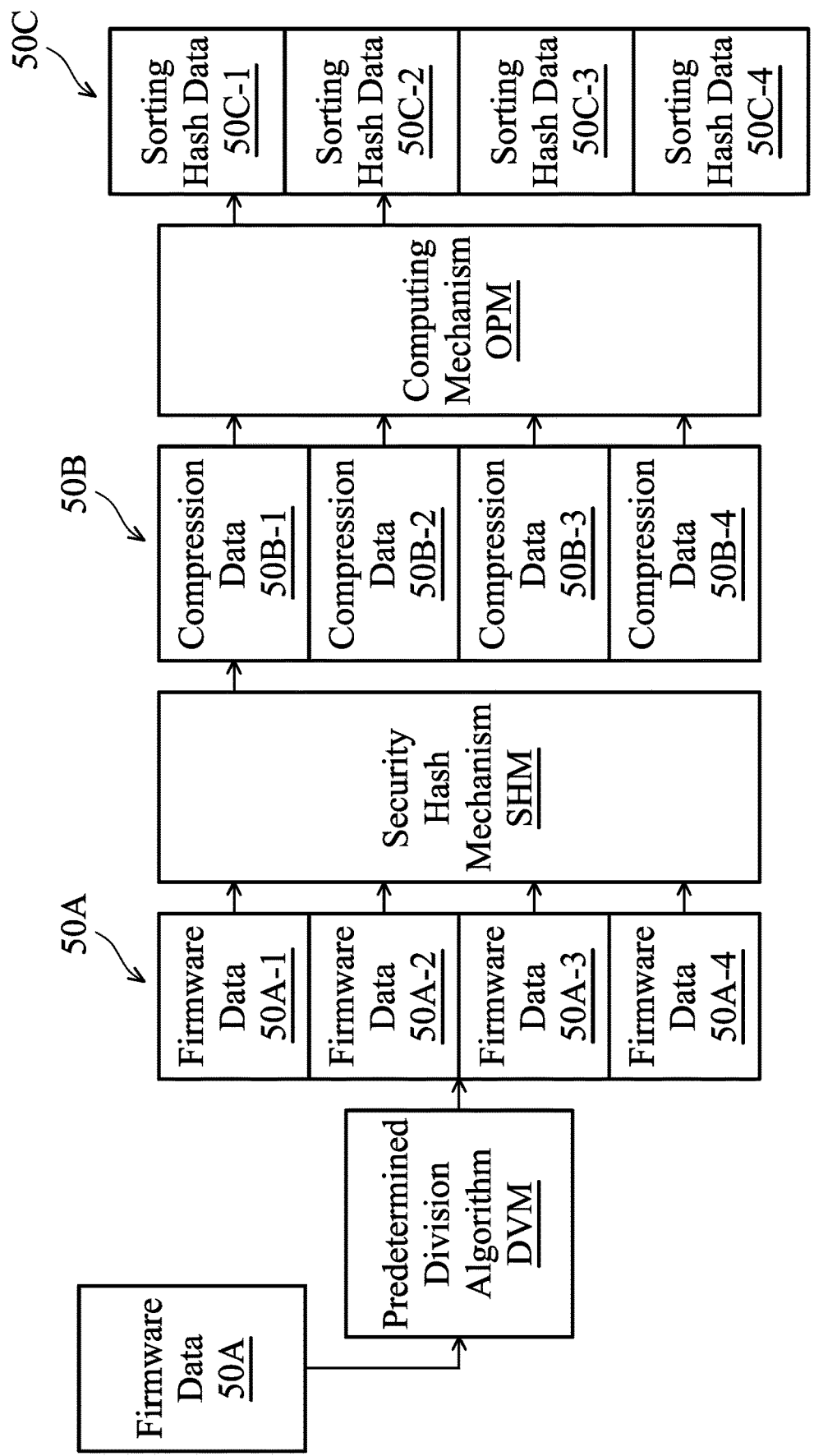
FIG. 5 is schematic illustrating a data storage method for certifying firmware data according to an embodiment of the invention.

FIG. 5 is schematic illustrating a data storage method for certifying firmware data according to an embodiment of the invention. In the embodiment, the data storage method further includes a predetermined division algorithm DVM to certificate the firmware data and improve the security. As shown in FIG. 5, the predetermined division algorithm DVM divides the firmware data 50A into four firmware data 50A-1, 50A-2, 50A-3 and 50A-4 (the sub-firmware data). In other words, the summation of the four firmware data 50A-1, 50A-2, 50A-3 and 50A-4 is the original firmware data 50A.

It should be noted that the division of the above four firmware data 50A-1~50A-4 are for illustration, not for limiting the present invention. Persons skilled the art could divide the firmware data of other numbers based on the content of the present invention, which are still within the scope of the present invention.

Afterwards, the SHA 300 performs the hash operation for the four firmware data 50A-1, 50A-2, 50A-3 and 50A-4, and generates four hash data 50B-1, 50B-2, 50B-3 and 50B-4. The summation of the four hash data 50B-1, 50B-2, 50B-3 and 50B-4 is the hash data 50B.

In one embodiment, the computing algorithm OPM performs computation on the four hash data 50B-1, 50B-2, 50B-3 and 50B-4, and generates four sorting hash data 50C-1, 50C-2, 50C-3 and 50C-4. The summation of the four sorting hash data 50C-1, 50C-2, 50C-3 and 50C-4 is the sorting hash data 50C. In another embodiment, the hash data 50B is re-assembled by the mapping and sorting algorithm PTM and computed by the computing algorithm OPM to generate the sorting hash data 50C.

Figure 6A:
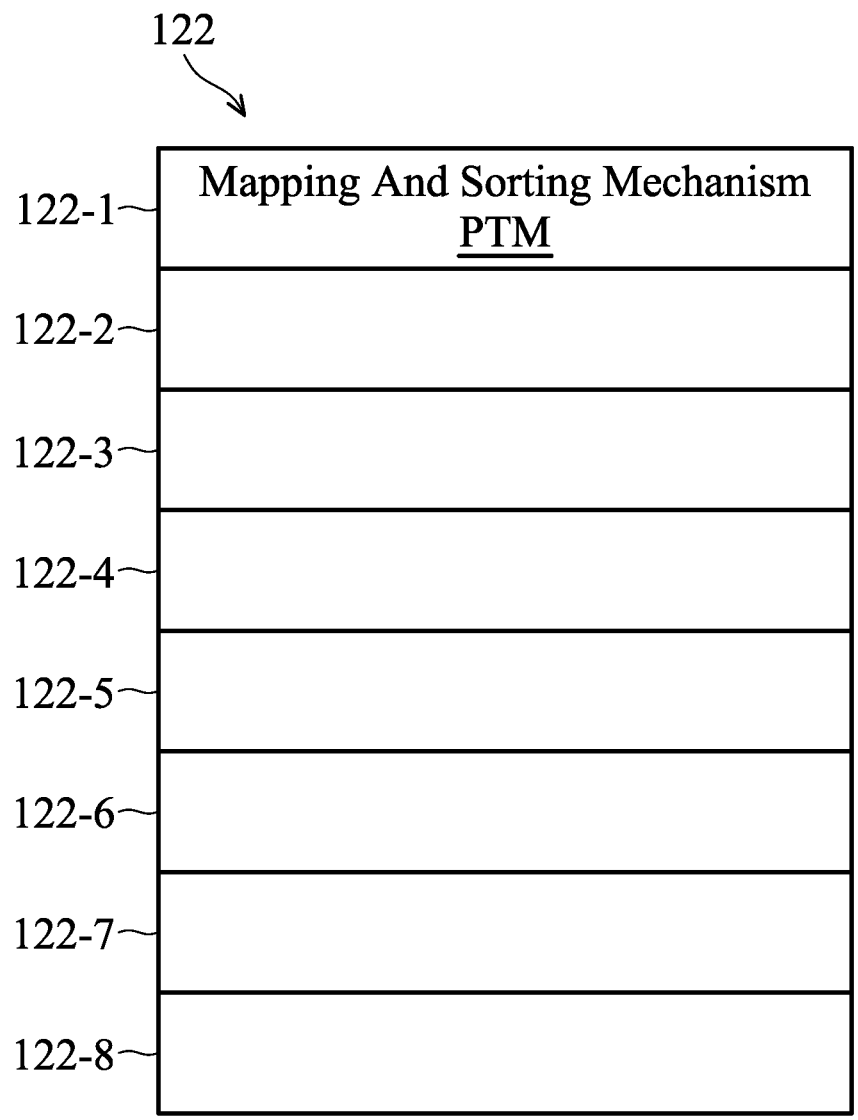
FIG. 6A is schematic illustrating an efuse region for certifying firmware data according to an embodiment of the invention.

FIG. 6A is schematic illustrating an efuse region 122 for certifying firmware data according to an embodiment of the invention. In one embodiment, the efuse region 122 includes a plurality of specific regions 122-1~128-8 to store specific data. As shown in FIG. 6A, the mapping and sorting algorithm PTM is stored in the specific region 122-1. In other words, the specific region 122-1 could only be utilized to store the mapping and sorting algorithm PTM, and it cannot be utilized to store other algorithms or data. In addition, the above mapping and sorting algorithm PTM is written into the efuse region 122 at one time, and it can only be read by the controller 120.

Figure 6B:
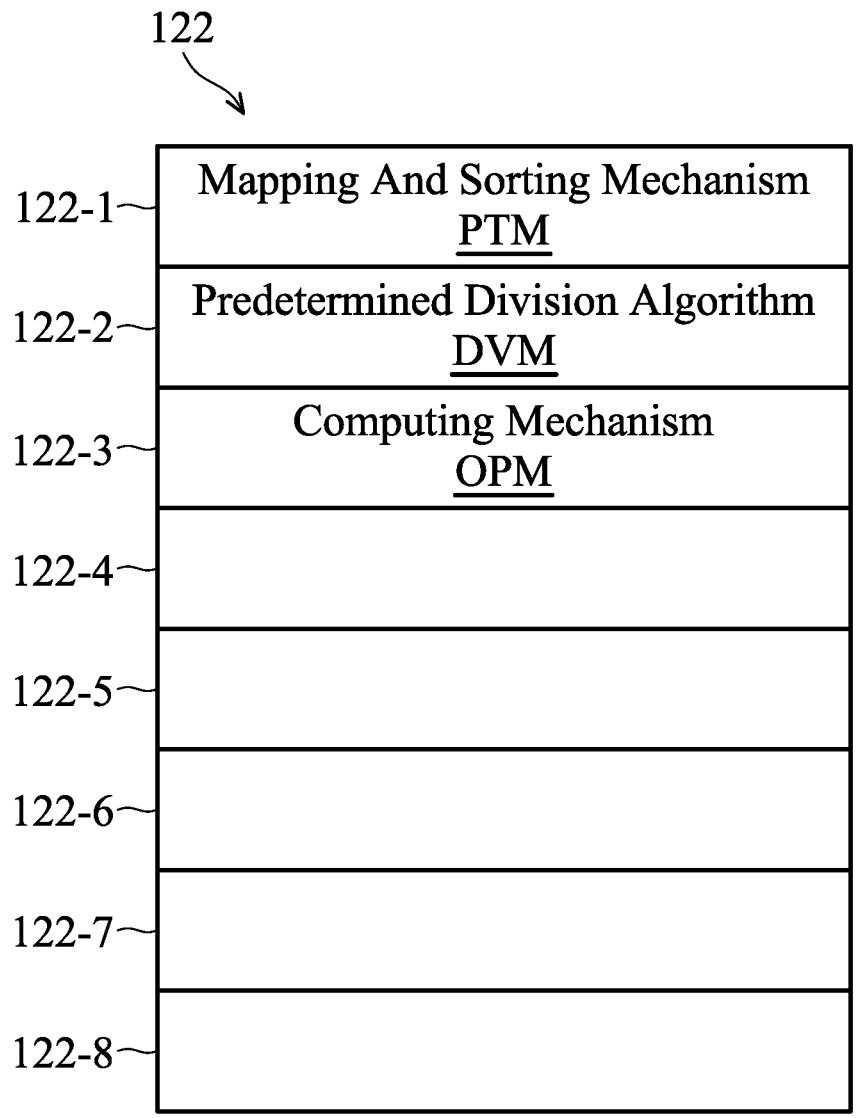
FIG. 6B is schematic illustrating another efuse region for certifying firmware data according to an embodiment of the invention.

FIG. 6B is schematic illustrating another efuse region 122 for certifying firmware data according to an embodiment of the invention. In some embodiment, the data storage method not only includes the mapping and sorting algorithm PTM, but also includes the predetermined division algorithm DVM and the computing algorithm OPM. As shown in FIG. 6B, the mapping and sorting algorithm PTM is stored in the specific region 122-1, the predetermined division algorithm DVM is stored in the specific region 122-2, and the computing algorithm OPM is stored in the specific region 122-3. It should be noted that if any one or two of the above algorithms are complicated, at least two specific regions could be utilized to store one algorithm.

Figure 7:
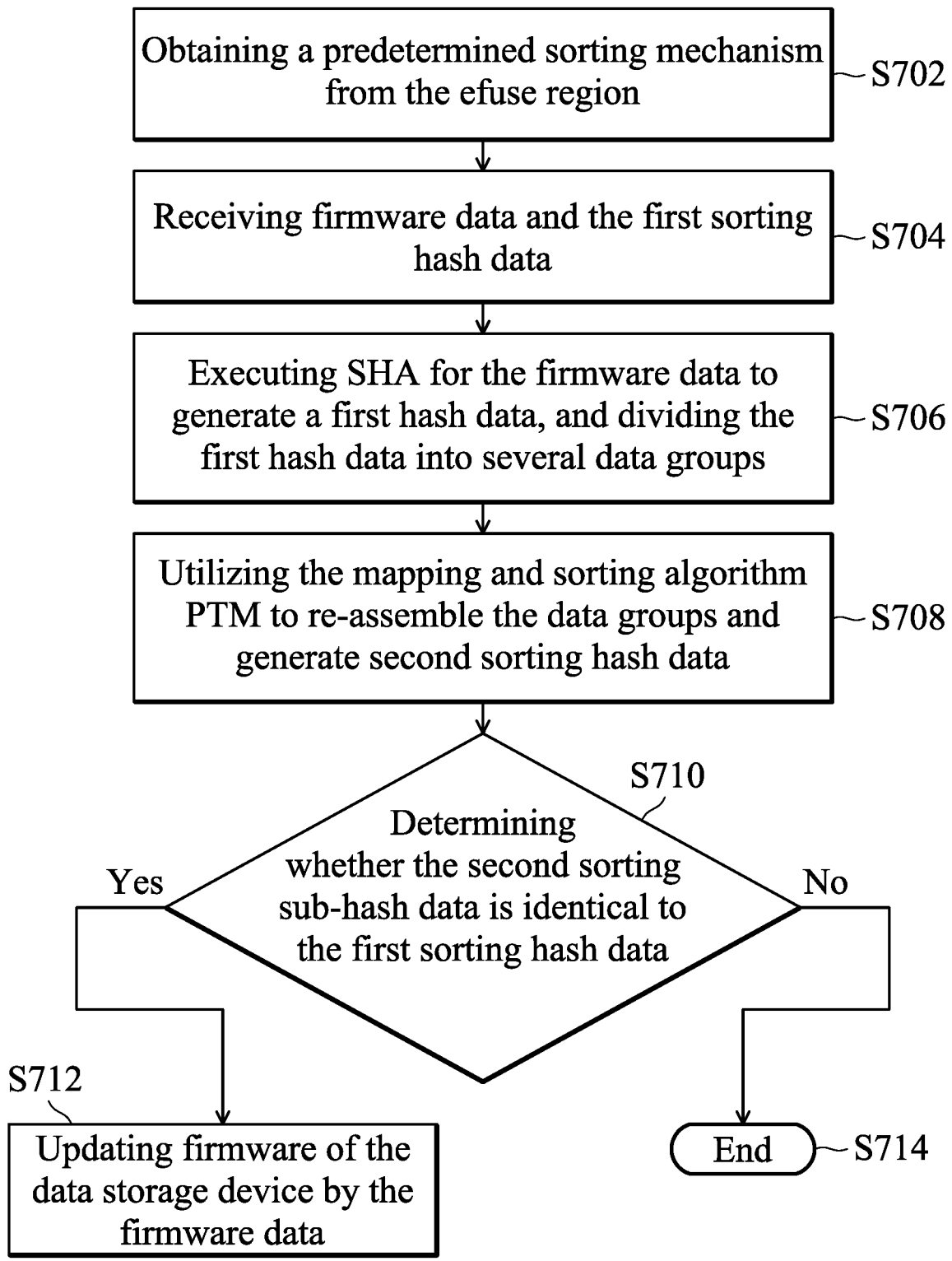
FIG. 7 is schematic illustrating a data storage method for certifying firmware data according to an embodiment of the invention.

FIG. 7 is schematic illustrating a data storage method for certifying firmware data according to an embodiment of the invention. In step S702, the controller 120 reads the mapping and sorting algorithm PTM from the efuse region 122. Afterwards, in step S704, the controller 120 obtains the firmware data and its related first sorting hash data. The firmware data and the first sorting hash data are obtained from the firmware package. In step S706, the controller 120 executes the SHA 300 for the firmware data to generate a first hash data, and divides the first hash data into several data groups. In step S708, the controller 120 utilizes the mapping and sorting algorithm PTM to re-assemble the data groups and generate second sorting hash data.

Afterwards, in step S710, the controller 120 determines whether the second sorting hash data is identical to the first sorting hash data or not. If they are not identical, step S614 will be executed to terminate the execution of the data storage method for certifying firmware data. If the second sorting hash data is identical to the first sorting hash data, step S712 will be executed so that the controller 120 updates firmware of the data storage device 100 by the firmware data. If the second sorting hash data is not identical to the first sorting hash data, step S714 will be executed to complete the process.

Figure 8:
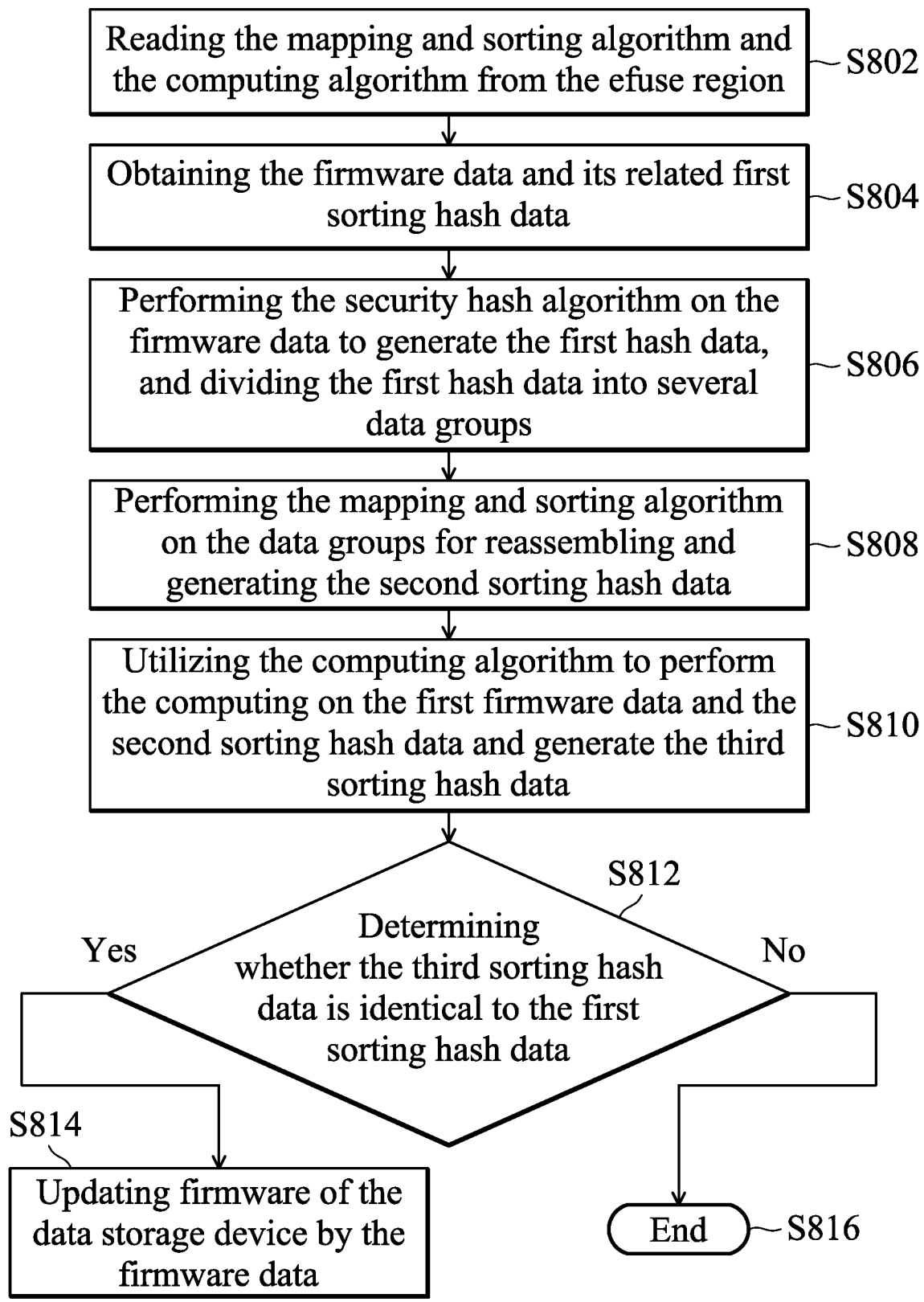
FIG. 8 is schematic illustrating another data storage method for certifying firmware data according to an embodiment of the invention.

FIG. 8 is schematic illustrating another data storage method for certifying firmware data according to an embodiment of the invention. Compared to the embodiment of FIG. 7, the process of the computing algorithm OPM is further incorporated in the embodiment of FIG. 8. In step S802, the controller 120 reads the mapping and sorting algorithm PTM and the computing algorithm OPM from the efuse region 122. Afterwards, in step S804, the controller 120 obtains the firmware data and its related first sorting hash data. In step S806, the security hash algorithm is performed on the firmware data by the controller 120 to generate the first hash data, and the first hash data is divided into several data groups.

In step S808, the mapping and sorting algorithm PTM is performed on the data groups by the controller 120 for reassembling and generating the second sorting hash data. In step S810, the controller 120 utilizes the computing algorithm OPM to perform the computing on the first firmware data and the second sorting hash data and generate the third sorting hash data. Afterwards, in step S812, the controller 120 determines whether the third sorting hash data is identical to the first sorting hash data or not. If the third sorting hash data is identical to the first sorting hash data, step S814 will be executed so that the controller 120 updates firmware of the data storage device 100 by the firmware data. If the third sorting hash data is not identical to the first sorting hash data, step S816 will be executed to complete the process.

Figure 9:
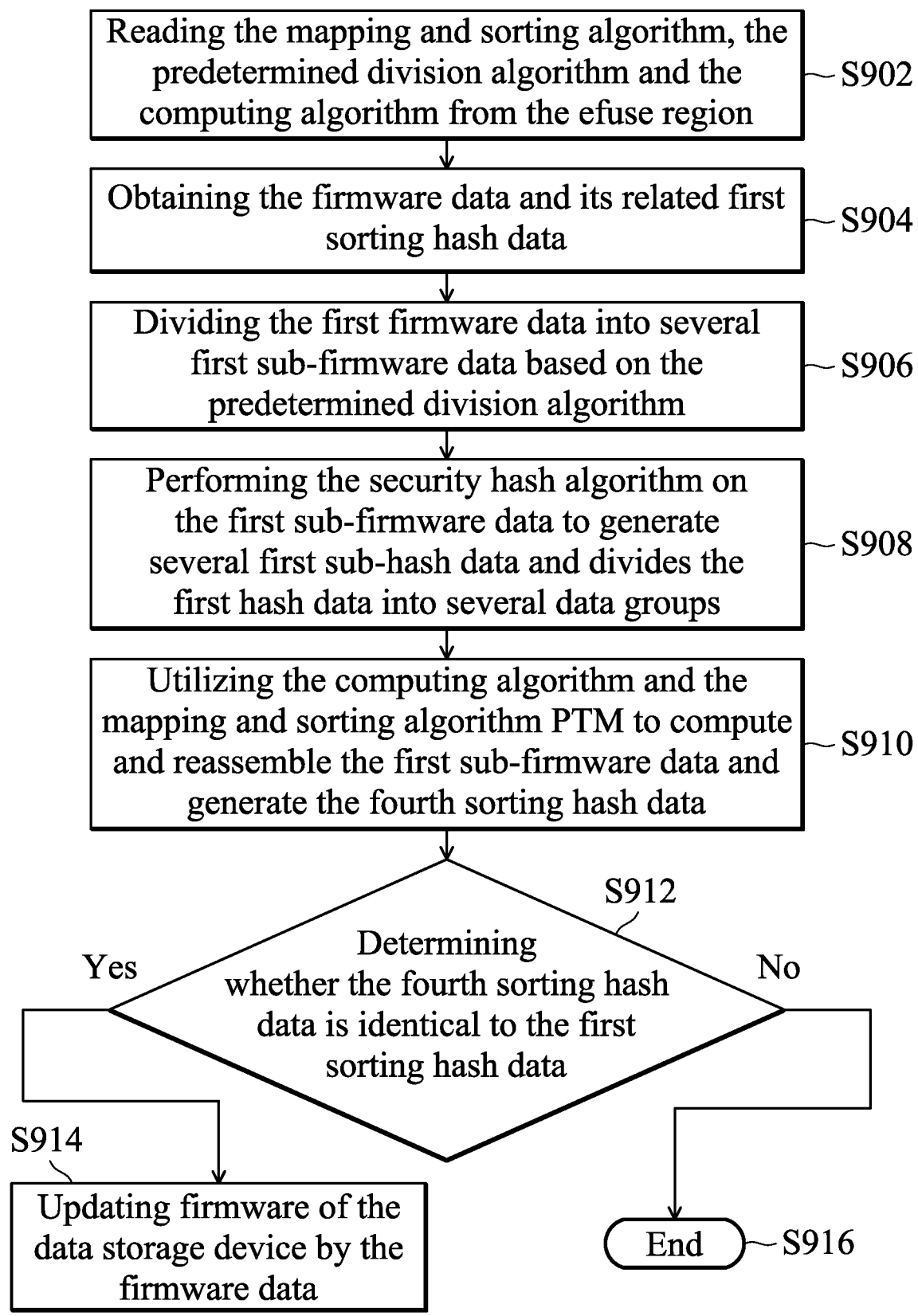
FIG. 9 is schematic illustrating another data storage method for certifying firmware data according to an embodiment of the invention.

FIG. 9 is schematic illustrating another data storage method for certifying firmware data according to an embodiment of the invention. Compared to the embodiments of FIG. 7 and FIG. 8, the process of the predetermined division algorithm DVM is further incorporated in the embodiment of FIG. 9. The above predetermined division algorithm DVM is set up by the manufacturer of the data storage device 100. In step S902, the controller 120 reads the mapping and sorting algorithm PTM, the predetermined division algorithm DVM and the computing algorithm OPM from the efuse region 122. Afterwards, in step S904, the controller 120 obtains the firmware data and its related first sorting hash data. In step S906, the controller 120 divides the first firmware data into several first sub-firmware data based on the predetermined division algorithm DVM.

In step S908, the controller 120 performs the security hash algorithm on the first sub-firmware data to generate several first sub-hash data and divides the first hash data into several data groups. In step S910, the controller 120 utilizes the computing algorithm OPM and the mapping and sorting algorithm PTM to compute and reassemble the first sub-firmware data and generate the fourth sorting hash data. Afterwards, in step S912, the controller 120 determines whether the fourth sorting hash data is identical to the first sorting hash data or not. If the fourth sorting hash data is identical to the first sorting hash data, step S914 will be executed so that the controller 120 updates firmware of the data storage device 100 by the firmware data. If the fourth sorting hash data is not identical to the first sorting hash data, step S916 will be executed to complete the process.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device for certifying firmware data, comprising:
    a flash memory; and
    a controller, coupled to the flash memory, utilized to receive at least one first sorting hash data which is related to a first firmware data, divide the first hash data into a plurality of data groups, and reassemble the data groups based on a mapping and sorting algorithm to generate a second sorting hash data, wherein each of the data groups of the first hash data is not one-to-one mapping to the second sorting hash data, and the controller further comprises:
    an efuse region, utilized for writing the mapping and sorting algorithm, wherein when the controller determines that the second sorting hash data is identical to the first sorting hash data, the first firmware data is allowed to update the controller.

2. The data storage device as claimed in claim 1, wherein the mapping and sorting algorithm is one-time written to the efuse region, and only the controller can read the mapping and sorting algorithm which is stored in the efuse region.

3. The data storage device as claimed in claim 1, wherein the first hash data is generated by compressing the first firmware data using a secure hash algorithm (SHA).

4. The data storage device as claimed in claim 1, wherein the mapping and sorting algorithm is utilized to replicate or ignore at least one of the data groups to generate the second sorting hash data.

5. The data storage device as claimed in claim 2, wherein the controller utilizes a computing algorithm to perform a computation on the first firmware data and the second sorting hash data to generate a third sorting hash data, and when the controller determines that the third sorting hash data is identical to the first sorting hash data, the first firmware data is allowed to update the controller.

6. The data storage device as claimed in claim 5, wherein the computing algorithm comprises an adding operation, a subtracting operation, a multiplication operation and a division operation.

7. The data storage device as claimed in claim 6, wherein the mapping and sorting algorithm is stored in a first specific region of the efuse region, and the computing algorithm is stored in a second specific region of the effuse region which is different from the first specific region.

8. The data storage device as claimed in claim 3, wherein the controller divides the first firmware data into a plurality of first sub-firmware data according to a predetermined division algorithm, and compresses each of the first sub-firmware data based on the SHA to generate a plurality of first sub-hash data respectively.

9. The data storage device as claimed in claim 8, wherein the controller utilizes a computing algorithm to perform a computation on each of the first sub-firmware data to generate a fourth sorting hash data, and when the controller determines that the fourth sorting hash data is identical to the first sorting hash data, the first firmware data is allowed to update the controller.

10. The data storage device as claimed in claim 1, wherein the mapping and sorting algorithm is set up by a manufacturer of the data storage device.

11. A data storage method for certifying firmware data, applied to a data storage device which comprises a flash memory and a controller, comprising:
    receiving at least one first sorting hash data which is related to a first firmware data;
    dividing the first hash data into a plurality of data groups;
    reassembling the data groups based on a mapping and sorting algorithm to generate a second sorting hash data, wherein each of the data groups of the first hash data is not one-to-one mapping to the second sorting hash data;
    writing the mapping and sorting algorithm; and
    when the controller determines that a second sorting hash data is identical to the first sorting hash data, allowing the first firmware data to update the controller.

12. The data storage method as claimed in claim 11, wherein the predetermined sorting algorithm is one-time written to a first specific region of the efuse region, and only the controller can read the predetermined sorting algorithm which is stored in the efuse region.

13. The data storage method as claimed in claim 12, wherein the first hash data is generated by compressing the first firmware data using a secure hash algorithm (SHA).

14. The data storage method as claimed in claim 11, wherein the mapping and sorting algorithm is utilized to replicate or ignore at least one of the data groups to generate the second sorting hash data.

15. The data storage method as claimed in claim 12, further comprising:
- utilizing a computing algorithm to perform a computation on the first firmware data and the second sorting hash data to generate a third sorting hash data; and
- when the controller determines that the third sorting hash data is identical to the first sorting hash data, allowing the first firmware data to update the controller.

16. The data storage method as claimed in claim 15, wherein the computing algorithm comprises an adding operation, a subtracting operation, a multiplication operation and a division operation.

17. The data storage method as claimed in claim 13, further comprising:
- dividing the first firmware data into a plurality of first sub-firmware data according to a predetermined division algorithm; and
- compressing each of the first sub-firmware data based on the SHA to generate a plurality of first sub-hash data.

18. The data storage method as claimed in claim 13, further comprising:
- utilizing a computing algorithm to perform a computation on each of the first sub-firmware data to generate a fourth sorting hash data; and
- when the controller determines that the fourth sorting hash data is identical to the first sorting hash data, allowing the first firmware data to update the controller.

* * * * *